Feb. 18, 1964 W. L. GLOMB 3,121,844

AMPLIFIER CONTROL SYSTEM

Filed Aug. 4, 1959 2 Sheets-Sheet 1

INVENTOR.
WALTER L. GLOMB
BY Alfred C. Hill
AGENT

INVENTOR.
WALTER L. GLOMB
BY Alfred C. Hill
AGENT

United States Patent Office 3,121,844

Patented Feb. 18, 1964

3,121,844

AMPLIFIER CONTROL SYSTEM

Walter L. Glomb, Clifton, N.J., assignor to International Telephone and Telegraph Corporation, Nutley, N.J., a corporation of Maryland Filed Aug. 4, 1959, Ser. No. 831,574

15 Claims. (Cl. 330—10)

This invention relates to amplifier systems, and more particularly to a circuit for controlling the operating characteristics of an amplifier system such as parametric amplifier systems.

The discussion hereinbelow will be directed toward the illustration of this invention in relation to parametric devices, but this is not to be construed as a restriction thereto since the invention is useful with other amplifier systems having similar requirements.

A parametric device is used for its low noise property. The parametric device usually consists of a reactance circuit including a first tuned circuit, designated as the signal frequency circuit, a second tuned circuit designated as the idling circuit, and a variable reactance element or coupling circuit connected in common to the two tuned circuits, and a pump oscillator generating a signal to vary the coupling reactance of the variable reactance at a fixed frequency. Conventional parametric amplifiers have their output circuits coupled to the first tuned circuit, but the output circuit may instead be coupled to the idling circuit for use as a parametric converter.

The amplification property of parametric devices depend to some extent on regeneration. Regeneration is a function of the pump oscillator's power which is applied to the variable reactance element. It is possible that variations in the pump oscillator output power, which controls the gain, will cause the amplifier to go into oscillation. It is desirable, therefore, to control the pump oscillator power in order to keep the gain of the parametric device constant and thereby maintain the parametric device in a stable condition.

Also, since the output frequency of the parametric device is a function of the pump oscillator frequency, it would be possible to compensate for variations in the operating frequency of the parametric device by controlling the frequency of the pump oscillator.

An object of the present invention is to provide an improved circuit for controlling the operating characteristics of amplifier systems.

Another object of the present invention is to provide a control circuit for controlling the operating characteristics of parametric devices.

Still another object of the present invention is to provide a circuit to produce a signal to control variations in the gain of a parametric device.

A further object of the present invention is to provide a circuit to produce a signal to control variations in the operating frequency of a parametric device.

Still another object of the present invention is to provide a circuit to produce signals to simultaneously control variations in the gain and operating frequency of a parametric device.

A feature of the present invention is the provision of a control circuit for an amplifier system having a signal input means, a signal output means, and given operating characteristics including a source of signals having predetermined characteristics coupled to said input means, means responsive to the signals of said source at said output means and to the signals of said source to produce at least one control signal proportional to variations in said given operating characteristics, and means to couple said control signal to said amplifier system to compensate for variations in said given operating characteristics.

Another feature of the present invention is the provision of coupling a signal having a predetermined frequency modulated at a suitable low frequency through a parametric device having a given gain, detecting the envelope of said signal, attenuating said signal by an amount equal to the given gain of the parametric device, and then comparing the amplitude of this signal with the detected amplitude of the signal at the input of the parametric device to produce a control signal in accordance with the detected amplitude difference which is proportional to the gain variation of the parametric device and the employment of the control signal to adjust the gain of the parametric device.

Still another feature of this invention is the provision of two pilot signals of different frequencies operated on as outlined above to produce two different signals, each being proportional to amplitude variations experienced by their respective pilot signals as they are passed through the parametric device. The two signals are added together to produce a control signal proportional to the gain variation of the parametric device which is employed to adjust the power level of the pump oscillator signal to maintain a constant gain in the parametric device, and/or these two signals are subtracted from each other to produce a control signal proportional to the shift in the operating frequency of the parametric device which is employed to adjust the operating frequency of the pump oscillator signal to maintain the operating frequency of the parametric device constant.

The above mentioned and other features and objects of this invention will become more apparent by reference to the following description taken in conjunction with the accompanying drawings, in which.

Parametric devices utilizing variable capacity diodes have been found practical as microwave amplifiers because of their low noise figures. Of these devices, the parametric amplifier and parametric converter have been utilized in many various applications.

The parametric amplifier and parametric converter have the property producing negative resistance, or regeneration, which results in gain. The variable reactance coupling circuit of the amplifier is varied by the pump oscillator, which introduces a negative resistance (regeneration) which causes an energy transfer from the pump oscillator to the signal frequency circuit and the idling circuit. The regeneration phenomenon is therefore a function of pump oscillator power. In the practical case, undesired changes in pump oscillator power will cause the amplifier to go into oscillation. In order to prevent this condition of oscillation from occurring, it is desirable to regulate the pump oscillator power output to provide for a constant net gain of the amplifier, thereby providing stability. The technique employed by this invention is to monitor the gain of the amplifier and detect fluctuations in the gain. The pump oscillator power is then adjusted in accordance with a control signal proportional to the variations in gain.

By the same technique it is also possible to correct for variations in the operating frequency of the amplifier. This is desirable because parametric amplifiers and converters operate in the microwave region, and any drift in their operating frequency would cause a shift in passband (due to center frequency shift) and could result in unwanted distortion. In order to correct for operating frequency drift, the shift in the passband is monitored by a pair of pilot signals passed through the parametric device, and a control signal is produced therefrom to adjust the frequency of the pump oscillator to correct for the frequency drift.

Figures 1, 2:
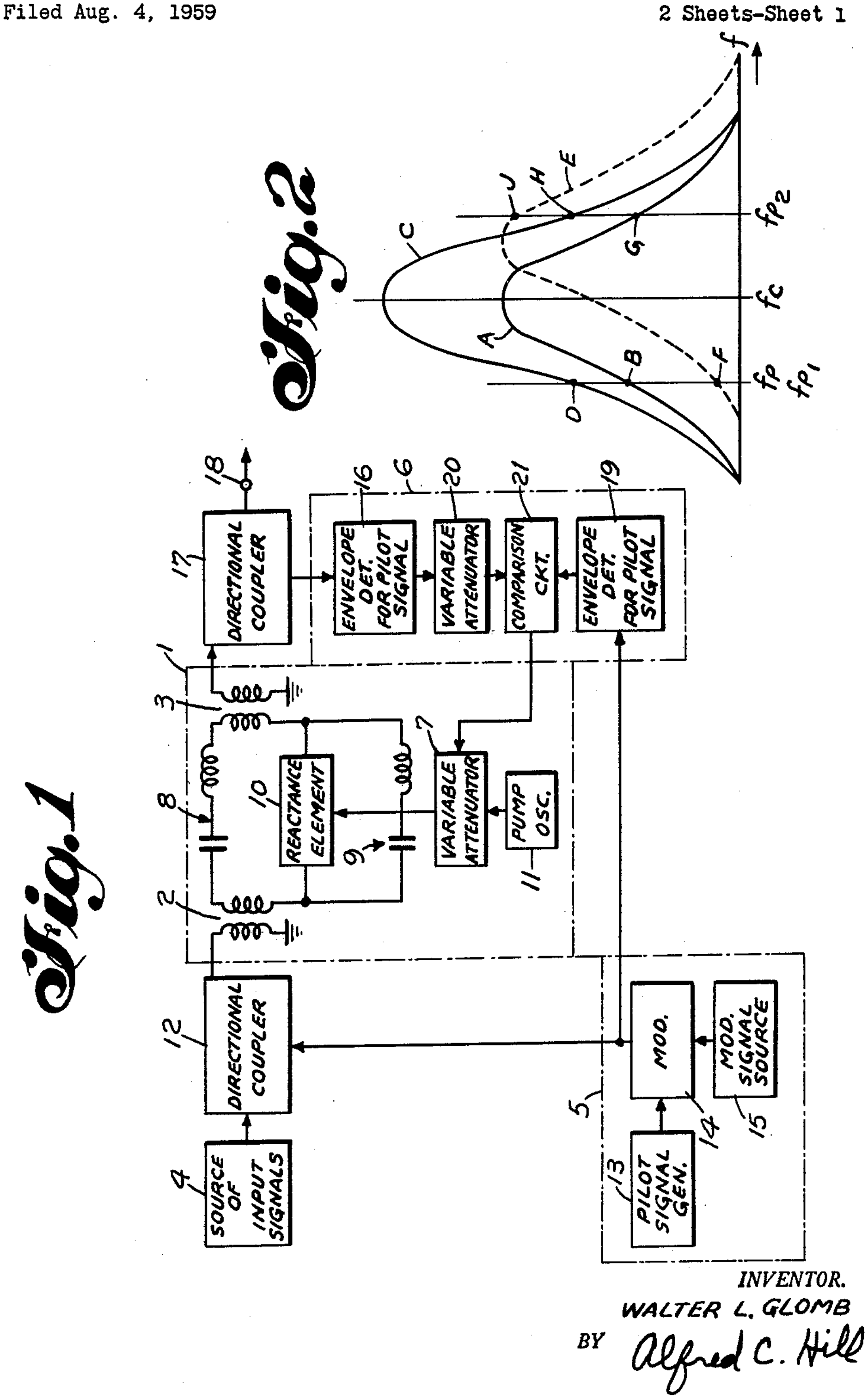
FIG. 1 is a schematic diagram of an embodiment of a control circuit in accordance with the principles of this invention.
FIG. 2 is a waveform useful in illustrating the principles of this invention.

Referring to FIG. 1, the control circuit for an amplifier system in accordance with this invention is illustrated for purposes of explanation in a cooperative relationship with a parametric device 1 including a signal input means 2, a signal output means 3, a signal frequency circuit 8, an idling circuit 9, a reactance element 10 coupled to signal frequency circuit 8 and idling circuit 9, and a pump oscillator 11 coupled to reactance element 10 by means of variable attenuator 7. Pump oscillator 11 is a stable frequency oscillator which may be a klystron. A first source of input signals 4 is coupled to input means 2 by directional coupler 12. The signals of source 4 may be those signals picked up by a radio receiver of any other source of signals which it is desired to amplify. The control circuit of FIG. 1 includes a second source of signals 5 also coupled to input means 2 by directional coupler 12, means 6 responsive to the signals of source 5 at output means 3 and the signals of source 5 at the output thereof to produce at least one control signal proportional to variations in the operating characteristics of parametric device 1, and means to couple the control signal to variable attenuator 7 to adjust the power level of the pump oscillator signal to maintain a constant gain in the parametric device.

Second source of signals 5 includes a pilot signal generator 13 which generates a signal of stable frequency which has a value within the passband of parametric device 1. Pilot signal generator 13 is pulse modulated by modulator 14 at a low frequency determined by modulating signal source 15, so that the modulated pilot signals from source 5, after they are applied to and amplified by parametric device 1, will be of a form which may be recognized by a detection means at the output of parametric device 1. Means 6 includes a detector 16 to detect the envelope of the modulated pilot generator signals from source 5 which appear at output means 3. Detector 16 is coupled to output means 3 by directional coupler 17 so that a portion of the entire signal from output means 3 is applied to detector 16. Detector 16 is designed to detect only the envelope of the modulated pilot signal. Directional coupler 17 also passes the signal from output means 3 to output terminal 18. Means 6 further includes a second detector 19 to detect the envelope of the modulated pilot generator signals directly at the output of source 5, prior to their amplification by parametric device 1.

In order to more readily understand the function of the pilot signal, reference should be made to curve A, FIG. 2. Curve A represents the passband of an amplifier of the type illustrated in FIG. 1. The passband is substantially symmetrical about a center frequency $f_c$, which for parametric devices would be in the microwave region. The value of the pilot signal from generator 13 as amplified by parametric device 1 is illustrated by point B on curve A at a frequency designated $f_p$, which is the carrier frequency produced by generator 13. When an increased variation in gain occurs, the passband appears as illustrated by curve C, FIG. 2. The magnitude of the pilot signal will increase due to the increase in gain, and the new value is indicated by point D on curve C. The distance indicated by the length B—D of FIG. 2 is therefore proportional to the variation in gain of parametric device 1. The manner in which the embodiment of FIG. 1 produces a signal proportional to the variation in gain as illustrated by length B—D will now be discussed.

Detector 19 detects the value of the modulated pilot signal before amplification, and detector 16 detects the value of the modulated pilot signal after amplification, the value of the detected signal of detector 16 reflecting both the desired gain and the undesired variation in gain of parametric device 1. In order to obtain a signal reflecting only the undesired variation in gain, the signal from detector 16 should be reduced by an amount equal to the desired gain. A variable attenuator 20 is coupled to the output of detector 16 and the degree of attenuation is preselected to equal the magnitude of the desired gain expected from parametric device 1. The output of detector 19 represents the value of pilot signal generator signals before amplification, and the output of attenuator 20 represents the value of pilot signal generator signals after amplification, but reduced by the desired gain factor, so that if there are no variations in the gain of parametric device 1, the outputs of detector 19 and attenuator 20 should be equal. The output signals from detector 19 and attenuator 20 are coupled to a comparison circuit 21 where the signal magnitudes are compared. If the compared signals are unequal it is indicative that the gain of parametric device 1 has varied from the desired value, and the variation in the gain will be proportional to the difference between the signals from detector 19 and attenuator 20. This difference also being illustrated by length B—D, FIG. 2. The difference signal, if present, will appear at the output of comparison circuit 21, and is then coupled to variable attenuator 7. The difference signal operates as a control signal by controlling the amount of attenuation produced by attenuator 7. Attenuator 7 in turn, regulates the amount of pump oscillator power that is delivered to reactance element 10, and the gain of parametric device 1 is thereby controlled.

Figure 3:
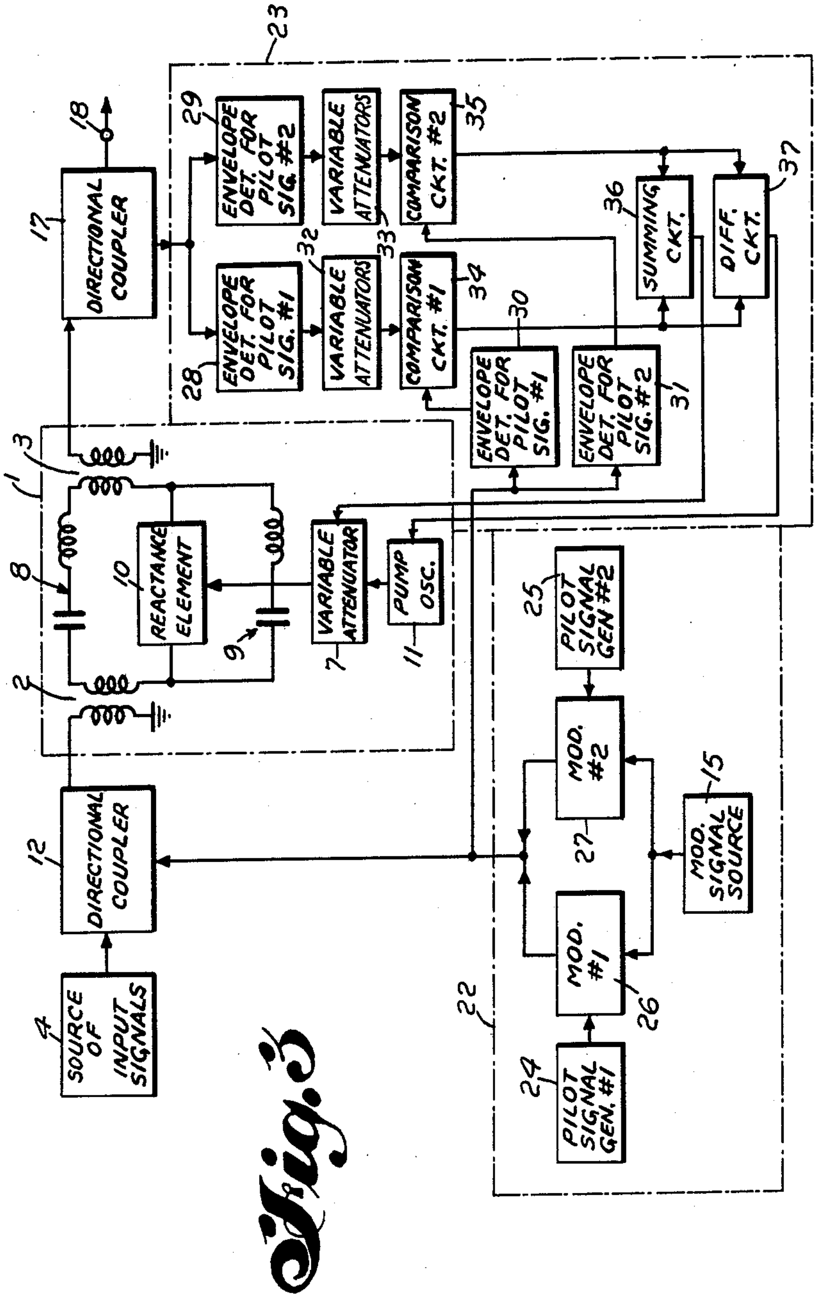
FIG. 3 is a schematic diagram of another embodiment of a control circuit in accordance with the principles of this invention.

The embodiment of FIG. 3 is based on similar principles as are employed in the embodiment of FIG. 1, with the additional feature of simultaneously providing a control for variations in the operating frequency of an amplifier system similar to parametric device 1.

Referring to FIG. 3, the modified control circuit for an amplifier system is again illustrated as being in a cooperative relationship with parametric device 1 including a signal input means 2, a signal output means 3, a signal frequency circuit 8, an idling circuit 9, a reactance element 10 coupled to signal frequency circuit 8 and idling circuit 9, and a pump oscillator 11 coupled to reactance element 10 by means of variable attenuator 7. A first source of signals 4 is coupled as in FIG. 1 to input means 2 by directional coupler 12. The control circuit of FIG. 3 includes a second source of signals 22 also coupled to input means 2 by directional coupler 12, means 23 responsive to the signals of source 22 at output means 3 and the signals of source 22 at the output thereof to produce a first and second control signal, the first control signal being proportional to variations in the gain of parametric device 1 and the second control signal being proportional to variations in the operating frequency of parametric device 1. The first and second control signals are coupled to variable attenuator 7 and pump oscillator 11, respectively, to correct for the variations in the gain and operating frequency of parametric device 1.

Second source of signals 22 includes a first pilot signal generator 24 generating a pilot signal of a first stable frequency of a value $f_{p1}$ within the passband of parametric device 1 and a second pilot signal generator 25 generating a pilot signal of a second stable frequency $f_{p2}$ disposed symmetrically with respect to the first pilot frequency about the center frequency of the passband of parametric device 1. The first and second pilot signals are pulse modulated by modulators 26 and 27, respectively, at a frequency determined by modulating signal source 15. The two modulated pilot signals are fed to parametric device 1 where they are amplified along with the signals from input source 4, and will then appear at output means 3.

Means 23 is coupled to output means 3 by directional coupler 17. Means 23 includes first detector 28 to detect the envelope of the first modulated pilot signal and second detector 29 to detect the envelope of the second modulated pilot signal, both modulated pilot signals being present in the signal obtained from output means 3. Means 23 also includes detector 30 to detect the envelope of the first modulated pilot signal and detector 31 to detect the envelope of the second modulated pilot signal directly from the output of second source of signals 22 prior to their amplification by parametric device 1.

Referring now to FIG. 2, curve E is shown illustrating the passband curve A after a shift in operating frequency has occurred and curve C is shown illustrating passband curve A after a variation in gain has occurred. Point B on curve A represents the magnitude of the first pilot signal $f_{p1}$ and point G represents the magnitude of the second pilot signal $f_{p2}$. After a variation in gain, with operating frequency remaining constant, the magnitude of the first pilot signal $f_{p1}$ is represented by point D on curve C, showing an increase in gain illustrated by length B—D and the magnitude of the second pilot signal $f_{p2}$ is represented by point H showing an increase in gain illustrated by length G—H. If length from the base line to D is compared to the length from the base line to B, the variation in gain is seen to be proportional to length B—D, and if the length from the baseline to H and the length from the baseline to G are compared, the variation in gain is seen to be proportional to G—H. If length B—D and G—H are added, the sum will also be proportional to the change in gain.

Consider curve E, FIG. 2 which represents a change in operating frequency with gain remaining constant. The magnitude of the first pilot signal $f_{p1}$ is reduced from point B to point F and the magnitude of the second pilot signal is increased from point G to point J due to the shift in the passband. If the length from the baseline to point B and the length from the baseline to point F are compared, the difference is seen to be length B—F and if the length from the baseline to point G and the length from the baseline to point J are compared, the difference is seen to be length G—J. Now if lengths B—F and G—J are subtracted, it is seen that the difference will be proportional to the amount of frequency shift which has occurred. It is to be understood that although the above explanation was carried out in terms of lengths of lines, the changes in length actually represent increasing and decreasing signal magnitudes, therefore the addition and subtraction discussed above are to be performed algebraically.

Since it was said that curve C represented a variation in gain only, it follows that the subtraction of lengths B—D and G—H is equal to zero, indicating no shift in frequency. Likewise, since curve E represents a shift in frequency only, it follows that the addition (algebraically) of lengths B—F and G—J is equal to zero, indicating no variation in gain.

It can be similarly shown that if a variation in gain and a shift in operating frequency were to occur simultaneously, the addition of the compared pilot signals would be proportional to the variation in gain, and the subtraction of the compared pilot signals would be proportional to the shift in operating frequency.

Referring again to FIG. 3, it was said that detector 30 detects the envelope of the first modulated pilot signal $f_{p1}$ and detector 31 detects the envelope of the second modulated pilot signal $f_{p2}$ prior to amplification. Likewise, detector 28 detects the envelope of pilot signal $f_{p1}$ and detector 29 detects the envelope of pilot signal $f_{p2}$ afer the pilot signals have been amplified. The detected pilot signals from detectors 28 and 29 are attenuated by variable attenuators 32 and 33 preset at an amount equal to the desired gain of parametric device 1. Detected attenuated first pilot signal $f_{p1}$ is then coupled to comparison circuit 34 where it is compared with the first detected pilot signal $f_{p1}$ from detector 30. If there is no variation in the gain or operating frequency of amplifier 1 the signals will be equal, but if there is a variation in those amplifier characteristics a difference signal will be produced. A similar difference signal will be produced upon the same occurrence in comparison circuit 35 based on the comparison of second pilot signals $f_{p2}$ from detector 31 and attenuator 33.

The output signals produced by comparison circuits 34 and 35 represent the combined variation of gain and operating frequency. It was shown hereinabove that the summation of these output signals resulted in a signal proportional to the variation in the gain, and the subtraction of these output signals resulted in a signal proportional to the variation in operating frequency. In accordance with this principle, the output signals from comparison circuits 34 and 35 are added in summing circuit 36 and the resulting control signal, proportional to the gain variation of parametric device 1 is coupled to variable attenuator 7 to control the output power of pump oscillator 11 to correct for the variation in gain. The output signals from comparison circuits 34 and 35 are also subtracted by difference circuit 37 and the difference signal therefrom, being proportional to the variation in operating frequency, is coupled to pump oscillator 11 as a control signal to adjust the frequency thereof in a well-known manner to correct for the variation in frequency of parametric device 1.

The embodiment of the invention shown in FIG. 3 automatically corrects for changes in gain, changes in operating frequency, or combinations of the two.

While I have described above the principle of my invention in connection with specific apparatus, it is to be clearly understood that this description is made only by way of example and not as a limitation to the scope of my invention as set forth in the objects thereof and in the accompanying claims.

I claim:

1. A control circuit for an amplifier system comprising:
(1) an amplifier system having given operating characteristics including
  (*a*) a signal input means,
  (*b*) a signal output means, and
  (*c*) first means coupled between said input means and said output means to provide said given operating characteristics;
(2) a first source of signals for amplification in said system coupled to said input means;
(3) a second source of signals coupled to said input means;
(4) means coupled to the output of said second source and said output means responsive to the signals of said second source to produce at least one control signal proportional to variations in said given operating characteristics; and
(5) means to couple said control signal to said first means to compensate for variations in said given operating characteristics.

2. A control circuit for an amplifier system comprising:
(1) an amplifier system having a given gain including
  (*a*) a signal input means,
  (*b*) a signal output means, and
  (*c*) means including a first source of signals coupled between said input means and said output means to provide said given gain;
(2) a second source of signals for amplification in said system coupled to said input means;
(3) a third source of signals coupled to said input means;
(4) means coupled to the output of said third source and said output means responsive to the signals of said third source to produce a control signal proportional to variations in said given gain; and
(5) means to couple said control signal to said first source to control the output power of the signal of said first source to compensate for variations in said given gain.

3. A control circuit for an amplifier system comprising:
(1) an amplifier system having a given gain including (a) a signal input means,
(b) a signal output means, and
(c) means including a first source of signals coupled between said input means and said output means to provide said given gain;
(2) a second source of signals for amplification in said system coupled to said input means;
(3) a source of two signals coupled to said input means, one of said signals having a first predetermined frequency and the other of said signals having a second predetermined frequency;
(4) means coupled to the output of said source of two signals and said output means responsive to the signals of said first and second predetermined frequencies to produce a control signal proportional to variations in said given gain; and
(5) means to couple said control signal to said first source to control the output power of the signal of said first source to compensate for variations in said given gain.

4. A control circuit for an amplifier system comprising:
(1) an amplifier system having a given operating frequency including
(a) a signal input means,
(b) a signal output means, and
(c) means including a first source of signals coupled between said input means and said output means to provide said given operating frequency;
(2) a second source of signals for amplification in said system coupled to said input means;
(3) a source of two signals coupled to said input means, one of said signals having a first predetermined frequency and the other of said signals having a second predetermined frequency;
(4) means coupled to the output of said source of two signals and said output means responsive to the signals of said first and second predetermined frequencies to produce a control signal proportional to variations in said given operating frequency; and
(5) means to couple said control signal to said first source to control the frequency of the signal of said first source to compensate for variations in said given operating frequency.

5. A control circuit for an amplifier system comprising:
(1) an amplifier system having a given gain and a given operating frequency including
(a) a signal input means,
(b) a signal output means, and
(c) means including a first source of signals coupled between said input means and said output means to provide said given gain and said given operating frequency;
(2) a second source of signals for amplification in said system coupled to said input means;
(3) a source of two signals coupled to said input means, one of said signals having a first predetermined frequency and the other of said signals having a second predetermined frequency;
(4) means coupled to the output of said source of two signals and said output means responsive to the signals of said first and second predetermined frequencies to produce a first control signal proportional to variations in said given gain and a second control sigal proportional to variations in said given operating frequency; and
(5) means to couple said first and second control signals to said first source to control the power and frequency, respectively, of the signal of said first source to compensate for variations in said given gain and said given operating frequency.

6. A control circuit for parametric devices comprising:
(1) a parametric device having given operating characteristics including
(a) a source of stable oscillations, and
(b) a variable reactance circuit coupled to the output of said source of stable oscillations having a signal input means and a signal output means;
(2) a first source of signals for amplification in said device coupled to said input means;
(3) means coupled to said output means to remove the amplified signal of said first source therefrom;
(4) a second source of signals coupled to said input means;
(5) means coupled to the output of said second source and said output means responsive to the signals of said second source to produce at least one control signal proportional to variations in said given operating characteristic; and
(6) means to couple said control signal to said source of stable oscillations to compensate for variations in said given operating characteristics.

7. A control circuit for parametric devices comprising:
(1) a parametric device having a given gain including
(a) a source of stable oscillations, and
(b) a variable reactance circuit coupled to the output of said source of stable oscillations having a signal input means and a signal output means;
(2) a first source of signals for amplification in said device coupled to said input means;
(3) means coupled to said output means to remove the amplified signal of said first source therefrom;
(4) a second source of signals coupled to said input means;
(5) means coupled to the output of said second source and said output means responsive to the signals of said second source to produce a control signal proportional to variations in said given gain; and
(6) means to couple said control signal to said source of stable oscillations to control the power of the oscillations coupled to said reactance circuit to compensate for said variations in said given gain.

8. A control circuit for parametric devices comprising:
(1) a parametric device having a given gain including
(a) a source of stable oscillations, and
(b) a variable reactance circuit coupled to the output of said source of stable oscillations having a signal input means and a signal output means;
(2) a first source of signals for amplification in said device coupled to said input means;
(3) means coupled to said output means to remove amplified signals of said first source therefrom;
(4) a source of two signals coupled to said input means, one of said signals having a first predetermined frequency and the other of said signals having a second predetermined frequency;
(5) means coupled to the output of said source of two signals and said output means responsive to the signals of said first and second predetermined frequencies to produce a control signal proportional to variations in said given gain; and
(6) means to couple said control signal to said source of stable oscillations to control the power of the oscillations coupled to said reactance circuit to compensate for said variations in said given gain.

9. A control circuit for parametric devices comprising:
(1) a parametric device having a given operating frequency including
(a) a source of stable oscillations, and
(b) a variable reactance circuit coupled to the the output of said source of stable oscillations having a signal input means and a signal output means;
(2) a first source of signals for amplification in said device coupled to said input means;
(3) means coupled to said output means to remove amplified signals of said first source therefrom;

(4) a source of two signals coupled to said input means, one of said signals having a first predetermined frequency and the other of said signals having a second predetermined frequency;
(5) means coupled to the output of said source of two signals and said output means responsive to the signals of said first and second predetermined frequencies to produce a control signal proportional to variations in said given operating frequency; and
(6) means to couple said control signal to said source of stable oscillations to control the frequency of the oscillations coupled to said reactance circuit to compensate for said variations in said given operating frequency.

10. A control circuit for parametric devices comprising:
(1) a parametric device having a given gain and a given operating frequency including
(a) a source of stable oscillations, and
(b) a variable reactance circuit coupled to the output of said source of stable oscillations having a signal input means and a signal output means;
(2) a first source of signals for amplification in said device coupled to said input means;
(3) means coupled to said output means to remove amplified signals of said first source therefrom;
(4) a source of two signals coupled to said input means, one of said signals having a first predetermined frequency and the other of said signals having a second predetermined frequency;
(5) means coupled to the output of said source of two signals and said output means responsive to the signals of said first and second predetermined frequencies to produce a first control signal proportional to variations in said given gain and a second control signal proportional to variations in said given operating frequency; and
(6) means to couple said first and second control signals to said source of stable oscillations to control the power and frequency, respectively, of the oscillations coupled to said reactance circuit to compensate for said variations in said given gain and said given operating frequency.

11. A control circuit for parametric devices comprising:
(1) a parametric device having given operating characteristics including
(a) a source of stable oscillations, and
(b) a variable reactance circuit coupled to the output of said source of stable oscillations having a signal input means and a signal output means;
(2) a source of intelligence signals for amplification in said device coupled to said input means;
(3) means coupled to said output means to remove the amplified signal of said source of intelligence signals therefrom;
(4) a signal generator coupled to said input means to generate signals having given characteristics;
(5) modulator means coupled to said signal generator to modulate the signals of said generator;
(6) means coupled to the output of said signal generator and said output means responsive to the modulated signals of said generator to produce at least one control signal proportional to variations in said given operating characteristics; and
(7) means to couple said control signal to said source of stable oscillations to compensate for said variations in said given operating characteristics.

12. A control circuit for parametric devices comprising:
(1) a parametric device having a given gain including
(a) a stable oscillator,
(b) a variable attenuator coupled to the output of said oscillator, and
(c) a variable reactance circuit coupled to the output of said variable attenuator having a signal input means and a signal output means;
(2) a source of intelligence signals coupled to said input means for amplification of the signal thereof in said device;
(3) means coupled to said output means to remove amplified signals of said source of intelligence signals therefrom;
(4) a signal generator coupled to said input means to generate signals having a predetermined frequency;
(5) modulator means coupled to said signal generator to modulate the signals of said generator;
(6) a first detector coupled to said input means to detect the envelope of the modulated signal of said generator at said input means;
(7) a second detector coupled to said output means to detect the envelope of the modulated signal of said generator at said output means;
(8) an attenuator coupled to said second detector to attenuate the output signals therefrom by an amount equal to said given gain;
(9) a comparison circuit coupled in common to the output of said first detector and the output of said attenuator to compare the amplitude of the output signals therefrom to produce a control signal proportional to variations in said given gain; and
(10) means to couple said control signal to said variable attenuator to vary the power of the output signal of said stable oscillator in accordance with said control signal to compensate for said variations in said given gain.

13. A control circuit for parametric devices comprising:
(1) a parametric device having a given gain including
(a) a stable oscillator,
(b) a variable attenuator coupled to the output of said oscillator, and
(c) a variable reactance circuit coupled to the output of said variable attenuator having a signal input means and a signal output means;
(2) a source of intelligence signals coupled to said input means for amplification of the signals thereof in said device;
(3) means coupled to said output means to remove amplified signal of said source of intelligence signals therefrom;
(4) a first signal generator coupled to said input means to generate signals having a first predetermined frequency;
(5) a first modulator means coupled to said first signal generator to modulate the signals of said first generator;
(6) a second signal generator coupled to said input means to generate signals having a second predetermined frequency;
(7) a second modulator means coupled to said second signal generator to modulate the signals of said second generator;
(8) a first and a second detector coupled to said input means to, respectively, detect the envelopes of the modulated signals of said first and second generators at said input means;
(9) a third and a fourth detector coupled to said output means to, respectively, detect the envelope of the modulated signals of said first and second generators at said output means;
(10) a first and a second attenuator coupled, respectively, to said third and fourth detector to attenuate the output signals therefrom by an amount equal to said given gain;
(11) a first comparison circuit coupled to the output of said first detector and the output of said first attunator to compare the amplitudes of the output signals therefrom;
(12) a second comparison circuit coupled to said second detector and said second attenuator to compare the amplitudes of the output signals therefrom;
(13) means coupled to the output of said first and second comparison circuit to add the output signals therefrom to produce a control signal at the output thereof proportional to variations in said given gain; and

(14) means to couple said control signal to said variable attenuator to vary the power of the output signal of said stable oscillator in accordance with said control signal to compensate for said variations in said given gain.

14. A control circuit for parametric devices comprising:

(1) a parametric device having a given operating frequency and a given gain including
  (*a*) a stable oscillator, and
  (*b*) a variable reactance circuit coupled to the output of said oscillator having a signal input means and a signal output means;

(2) a source of intelligence signals coupled to said input means for amplification of the signals thereof in said device;

(3) means coupled to said output means to remove amplified signals of said source of intelligence signals therefrom;

(4) a first signal generator coupled to said input means to generate signals having a first predetermined frequency;

(5) a first modulator means coupled to said first signal generator to modulate the signals of said first generator;

(6) a second signal generator coupled to said input means to generate signals having a second predetermined frequency;

(7) a second modulator means coupled to said second signal generator to modulate the signals of said second generator;

(8) a first and a second detector coupled to said input means to, respectively, detect the envelopes of the modulated signals of said first and second generators at said input means;

(9) a third and fourth detector coupled to said output means to, respectively, detect the envelope of the modulated signals of said first and second generators at said output means;

(10) a first and a second attenuator coupled, respectively, to said third and fourth detectors to attenuate the output signals therefrom by an amount equal to said given gain;

(11) a first comparison circuit coupled to the output of said first detector and the output of said first attenuator to compare the amplitudes of the output signals therefrom;

(12) a second comparison circuit coupled to the output of said second detector and the output of said second attenuator to compare the amplitudes of the output signals therefrom;

(13) means coupled to the output of said first and second comparison circuit to subtract the output signals therefrom to produce a control signal proportional to variations in said given operating frequency; and

(14) means to couple said control signal to said stable oscillator to vary the frequency of said stable oscillator in accordance with said control signal to compensate for said variations in said given operating frequency.

15. A control circuit for parametric devices comprising:

(1) a parametric device having a given operating frequency and a given gain including
  (*a*) a stable oscillator,
  (*b*) a variable attenuator coupled to the output of said oscillator, and
  (*c*) a variable reactance circuit coupled to the output of said variable attenuator having a signal input means and a signal output means;

(2) a source of intelligence signals coupled to said input means for amplification of the signal thereof in said device;

(3) means coupled to said output means to remove amplified signal of said source of intelligence signals therefrom;

(4) a first signal generator coupled to said input means to generate signals having a first predetermined frequency;

(5) a first modulator means coupled to said first signal generator to modulate the signals of said first generator;

(6) a second signal generator coupled to said input means to generate signals having a second predetermined frequency;

(7) a second modulator means coupled to said second signal generator to modulate the signals of said second generator;

(8) a first and a second detector coupled to said input means to, respectively, detect the envelopes of the modulated signals of said first and second generators at said input means;

(9) a third and a fourth detector coupled to said output means to, respectively, detect the envelope of the modulated signals of said first and second generators at said output means;

(10) a first and a second attenuator coupled, respectively, to said third and fourth detectors to attenuate the output signals therefrom by an amount equal to said given gain;

(11) a first comparison circuit coupled to the output of said first detector and the output of said first attenuator to compare the amplitudes of the output signals therefrom;

(12) a second comparison circuit coupled to the output of said second detector and the output of said second attenuator to compare the amplitudes of the output signals therefrom;

(13) means coupled to the output of said first and second comparison circuit to add the output signals therefrom to produce a first control signal proportional to variations in said given gain;

(14) means coupled to the output of said first and second comparison circuit to subtract the output signals therefrom to produce a second control signal proportional to variations in said given operating frequency;

(15) means coupling said first control signal to said variable attenuator to vary the power of the signal output of said stable oscillator in accordance with said first control signal to compensate for variations in said given gain; and

(16) means coupling said second control signal to said stable oscillator to vary the frequency of said stable oscillator in accordance with said second control signal to compensate for variations in said given operating frequency.

References Cited in the file of this patent

UNITED STATES PATENTS

| | | |
|---|---|---|
| 2,584,004 | Enslein | Jan. 29, 1952 |
| 2,589,029 | Pratt | Mar. 11, 1952 |
| 2,719,223 | Van Der Ziel et al. | Sept. 27, 1955 |
| 2,840,646 | Bell | June 24, 1958 |
| 2,866,018 | Bell | Dec. 23, 1958 |
| 2,935,696 | Ault | May 3, 1960 |

FOREIGN PATENTS

| | | |
|---|---|---|
| 778,883 | Great Britain | July 10, 1957 |

OTHER REFERENCES

Publication: Physical Review, vol. 106, No. 2, April 15, 1957, pages 384, 385.

Publication: Proceedings of the IRE, May 1958, pages 850–860, by Rowe.